United States Patent [19]
Quillen et al.

[11] Patent Number: 6,094,189
[45] Date of Patent: Jul. 25, 2000

[54] VISUAL ECHO REMOTE LASER POINTER

[76] Inventors: Wendell A. Quillen, 6435 Ember Ave., Cocoa, Fla. 32907; Ian David Storrs, 2114 Glen Heights Dr., Garland, Tex. 75040; J. David Galloway, 546 W. Kelly Park Rd., Apopka, Fla. 32712

[21] Appl. No.: 09/062,118

[22] Filed: Apr. 17, 1998

[51] Int. Cl.$^7$ .................................................. G09G 5/08
[52] U.S. Cl. ........................... 345/158; 345/156; 345/157; 345/8
[58] Field of Search .................................. 345/7, 8, 156, 345/158, 157, 173–183; 178/19.05

[56] References Cited

U.S. PATENT DOCUMENTS

| | | | |
|---|---|---|---|
| 4,280,135 | 7/1981 | Schlossberg | 358/93 |
| 4,400,724 | 8/1983 | Fields | 358/85 |
| 4,808,980 | 2/1989 | Drumm | 340/707 |
| 5,025,314 | 6/1991 | Tang | 358/93 |
| 5,059,019 | 10/1991 | McCullough | 352/131 |
| 5,237,384 | 8/1993 | Fukunaga et al. | 356/141 |
| 5,239,373 | 8/1993 | Tang | 358/93 |
| 5,394,616 | 3/1995 | Claxton | 33/275 |
| 5,428,417 | 6/1995 | Lichtenstein | 353/122 |
| 5,450,148 | 9/1995 | Shu | 353/42 |
| 5,515,079 | 5/1996 | Hauck | 345/157 |
| 5,587,928 | 12/1996 | Jones | 364/514 A |
| 5,835,078 | 11/1998 | Arita et al. | 345/158 |

*Primary Examiner*—Vijay Shankar
*Assistant Examiner*—Mansour M. Said
*Attorney, Agent, or Firm*—Law Offices of Brian S. Steinberger; Brian S. Steinberger

[57] ABSTRACT

A remote laser pointer system that directs a worker through a situation by a skilled person(servor) controlling the laser pointer from a remotely location. The system can operate over any telephone line or wireless communication that is capable of full duplex communications. The servor can use a video camera and microphone to hear and see the remote location and can control the position of the pointed laser beam with a movable mouse and computer. The worker can wear the camera, microphone and laser pointer on a portable headset.

20 Claims, 9 Drawing Sheets

VISUAL ECHO REMOTE LASER POINTER

This invention relates to laser pointers, and in particular to a method and apparatus for controlling a laser pointer at a remote location to direct a user to follow directions communicated by telephone or wireless communications by a skilled operator-servor who controls the movement of the laser pointer.

BACKGROUND AND PRIOR ART

With more businesses using more advanced technologies, there has been an increasing need for greater technical training. Many classrooms are now capable of using computer controlled overhead viewgraphs for teaching students. See U.S. Pat. No. 5,515,079 to Hauck. Furthermore, handheld laser pointers have become increasingly popular in recent years to be used by instructors to point out detail on overhead projected slides and the like. See for example, U.S. Pat. No. 5,450,148 to Shu et al.

U.S. Pat. No. 4,280,135 to Schlossberg describes a remote pointing system where an instructor/briefer points at a screen with a laser pointer and can have the picture transmitted to a remote location. However, in Schlossberg, the instructor must manually point a laser at one screen and a second screen is required at the remote location for viewing, so that it is "essential that (an identical set of) viewgraphs at both the location of briefer 10(the transmitting location) and the remote location(the receiving location) be shown simultaneously", column 5, lines 9–12.

Other patents have been developed for allowing computer teleconferencing where participants can remotely share video, and sounds. See for example: U.S. Pat. Nos. 4,400,724 to Fields; 5,025,314 and 5,239,373 to Tang et al.; and 5,587,928 to Jones et al.

However, none of the prior art patents cited enable an instructor to point at a real time taken video image of remotely located technical equipment that needs to be worked on(repaired, etc.) with a laser pointer so that a worker at the remote site can be directly instructed with the laser beam being selectively pointed at the equipment to be worked on.

SUMMARY OF THE INVENTION

The first objective of the present invention is to provide a devise to allow a remotely located server to point to items within a viewing field of a camera located onsite so that a worker can get instruction from the remotely located servor.

The second object of this invention is to provide for a servor to operate a laser pointer at a remote site with a computer controlled mouse.

The third object of this invention is to provide a devise that uses telephone lines or wireless communications to remotely instruct a user with a laser pointer.

The fourth object of this invention is to provide a remotely operable laser pointer that allows one servor to give instructions to several distant sites simultaneously or consecutively.

The remote laser pointer is a devise allows an operator to control, by a personal computer, the direction in which a laser pointer is being pointed at a remote site which can be seen by the remote person referred to as (the remote). The invention can be used along with already existing technology such as video and audio telephony. The invention has the ability to not only see and hear the remote party which you are talking to but also be able to switch on a laser and point to items within the viewing field of the remote camera. This would increase better communications on both parties involved.

The invention has applicability in the service industry with servicemen/technicians working for example on heating and air conditioning equipment. Normally a serviceman/technician is sent to a job site. With the invention, they can go online with their office when problems occur with the equipment/machinery that is being worked on. A more qualified technician/servor can help the onsite serviceman through the dilemma with the remote pointer invention saving the company valuable time and money.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

A parts list of building the invention can be as follows:

| Quantity | Description |
|---|---|
| 2 | WTDIO-K (RS-232 Digital I/O card which can be purchased from Weeder Technologies/Phone#513-752-0279) |
| 2 | 741 OP-amp chips (cat#276-007 from Radio Shack) |
| 2 | TIP-41C npn Transistor (cat.#RSU-11371242 from Radio Shack) |
| 2 | TIP-42 pnp Transistor (cat.#RSU-11371259 from Radio Shack) |
| 18 | 10K ¼ watt Resistor (cat.#RSU-11346061 from Radio Shack) |
| 18 | 20K ¼ watt Resistor (cat.#RSU-11346160 from Radio Shack) |
| 4 | 2.0 ohm ¼ watt Resistor (cat.#900-0161 from Tech America) |
| 4 | 100K ¼ watt Resistor (cat.#RSU-11346350 from Radio Shack) |
| 2 | 27K ¼ watt Resistor (cat.#900-0180 from Tech America) |
| 4 | 56K ¼ watt Resistor (cat.#900-0260 from Tech America) |
| 4 | IN914 Diode (cat.#900-2904 from Tech America) |
| 2 | .01mfd mica capacitor (cat.#272-131 from Radio Shack) |
| 2 | 2N4401 Transistor (cat.#276-2058 from Radio Shack) |
| 2 | 1B4148 Diode (cat.#900-2908 from Tech America) |
| 1 | Cat# Gal-3 X-Y Scanner (Can be purchased from Meredith instruments/Phone#602-934-9482) |
| 1 | LDM-4d Laser Diode module (Can be purchased from Meredith instruments/Phone#602-934-9482) |
| 1 | Any color (preferably high resolution) video camera ccd with an RCA outputjack (over the counter item) |
| 1 | 25 pin RS-232 male connector/box mount (cat.#276-1547 from Radio Shack) |
| 1 | 8"W × 5"D × 3"H utility box (cat.#270-274 from Radio Shack) |
| 1 | 2 amp on/off push button switch SPST (cat.#275-617 from Radio Shack) |
| 4 | Small LED-option to use these but not needed (cat.#276-044 from Radio Shack) |
| 4 | LED box mounts-option to use these but not needed (cat.# 276-080a from Radio Shack) |
| 2 | 12 vdc SPDT PC relay 1 amp@125v (cat.#275-241 from Radio Shack)*note* only one side of the relay is used |
| 2 | 2" × 3" project solder boards (cat.#276-150 from Radio Shack) |
| 1 | Utility chord and plug (cat.#61-2746 from Radio Shack) |
| 1 | 8993-KT Power Supply (can be purchased from Marlin P. Jones & Associates/Phone#1-800-652-6733) |
| 1 | 8994-KT Dual power supply (can be purchased from Marlin P. Jones & Associates/Phone#1-800-652-6733) |
| 1 | small spool of 22 gauge bell wiring for internal parts (cat.#278-1224 from Radio Shack) |
| 4 | rubber feet (cat.#64-2342 from Radio Shack) |

Figure 1:
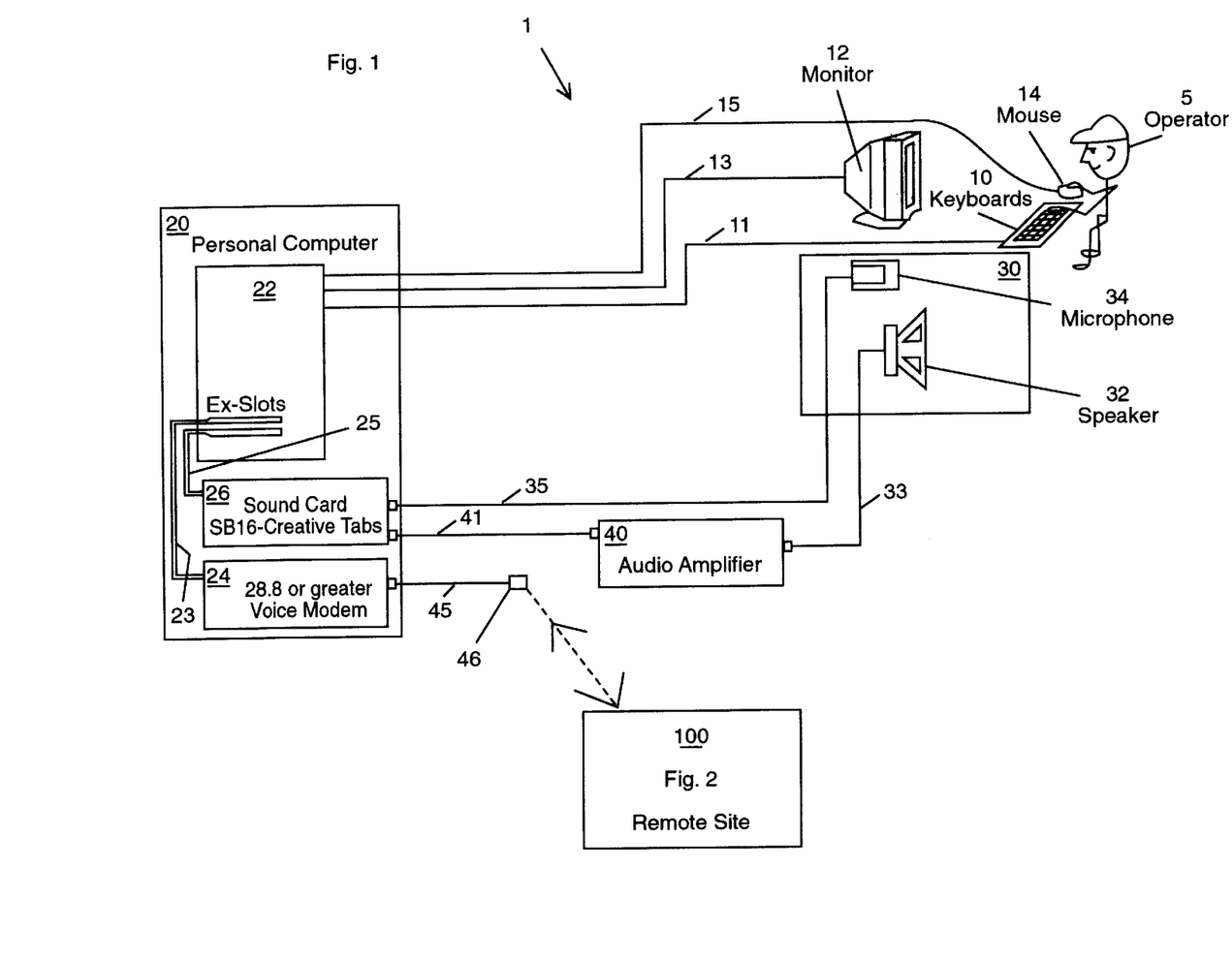
FIG. 1 shows a preferred setup of the operator layout of the visual echo invention.

FIG. 1 shows a preferred setup 1 of the operator layout of the visual echo invention. Referring to FIG. 1, an operator 5 uses a keyboard 10 to input commands and a computer mouse 14, to operate the remote laser pointer(shown and described in greater detail in reference to FIG. 2) while visually checking the remote site(shown in FIG. 2) that is seen through monitor 12. Mouse 14, keyboard 10 and monitor 12 connect by lines 11, 13 and 15 to a personal computer 20 such as an IBM compatible 486 or greater, having at least a 266 MHZ CPU 22 that connects by lines 23, 25 to a 28.8 bps or greater voice modem 24, and a sound card 26, such as model No. SB16 manufactured by Creative Labs. A communication box 30 such as desktop mounted telephone with speaker connects by lines 33 and 35 to the computer 20 and can include a microphone 34 and speaker 32 to allow the operator 5 to both listen and have voice communications with the remote site. An audio amplifier 40 can be incorporated in order to amplify sounds to the speaker 32. Box 30 can also be a headset which will be described in greater detail in reference to FIG. 8. Computer 20 connects by a standard phone line 45 to a wall jack 46 that connects over standard telephone lines to remote site layout 100 shown and described in in reference to FIG. 2.

Figure 2:
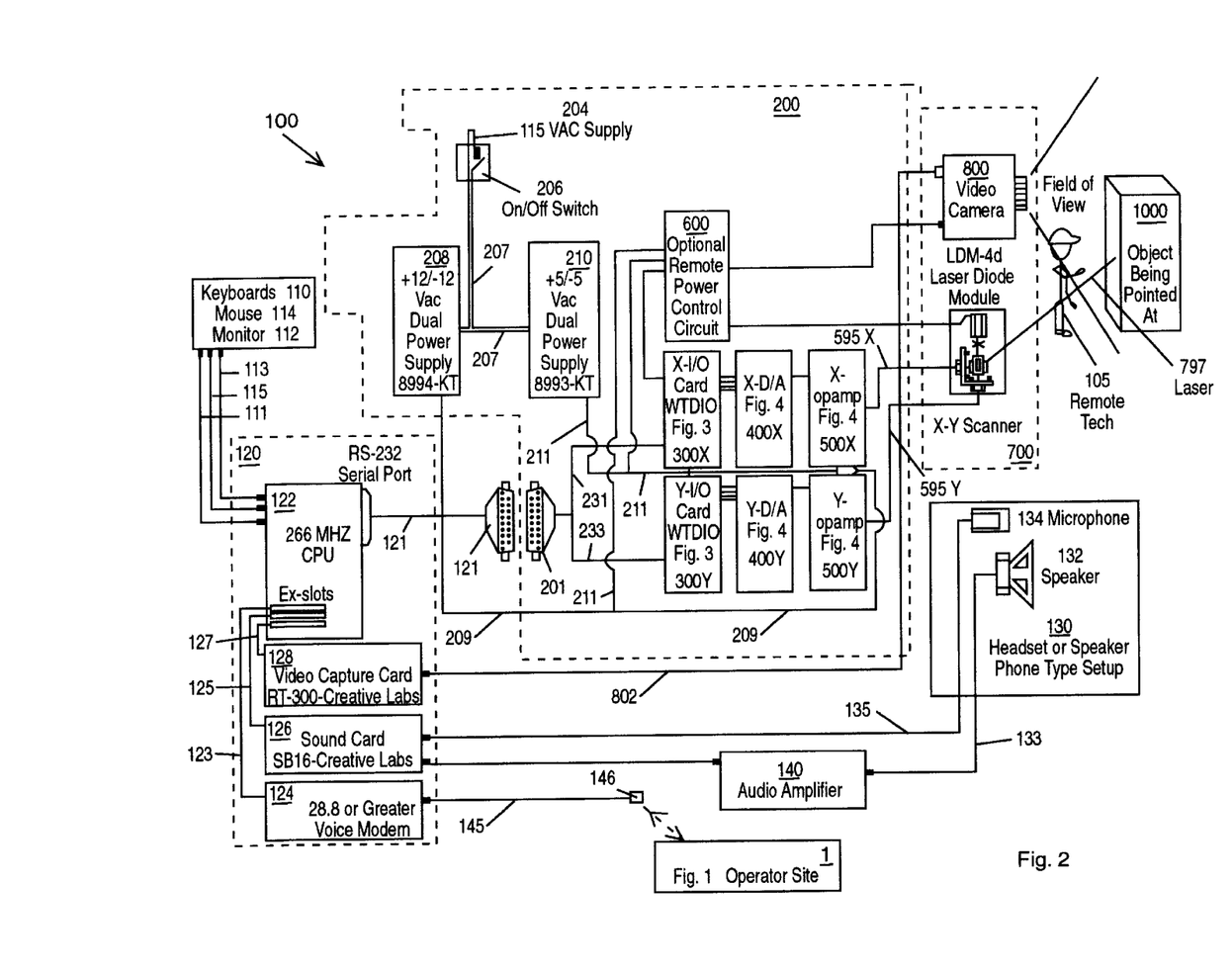
FIG. 2 shows a preferred setup of the remote laser pointer setup of the visual echo invention used with the operator layout of FIG. 1.

FIG. 2 shows a preferred setup 100 of the remote laser pointer setup of the visual echo invention used with the operator layout 1 of FIG. 1. Referring to FIG. 2, wall jack 146 connects over a standard phone line to communicate with the operator site 1(FIG. 1) to connect by phone line 145 to a personal computer 120 such as an IBM compatible 486 or greater having a 28.8 bps or greater voice modem 124, sound card 126 such as model no. SB16 manufactured by Creative Labs, and a video capture card such as model no. RT300 also manufactured by Creative cards. Modem 124, sound card 126 and video capture card 128 connect by lines 123, 125, and 127, respectively, to a 266 MHZ or greater CPU 122. Similar to FIG. 1, the remote technician can also use and operate a keyboard 110, computer mouse 114, and monitor 112 that connect by lines 111, 115 and 113 to CPU 122.

Referring to FIG. 2, a communication box 130 such as desktop mounted telephone with speaker connects by lines 133 and 135 to the computer 120 and can include a microphone 134 and speaker 132 to allow the remotely located technician 105 to both listen and have voice communications with the operator site 1 of FIG. 1. An audio amplifier 140 can be incorporated in in order to amplify sounds to the speaker 132. Box 130 can also be a headset which will be described in greater detail in reference to FIG. 8.

Referring to FIG. 2, personal computer 120 connects by a serial connection 121 to the main control box 200 by a mateable serial connection 201. Main control box 200 includes a 115 VAC power supply 204 that connects to an on/off switch 206 which can be a toggle type switch, the latter of which connects by line 207 that splits the connection to both a +12/−12 VAC Dual power supply 208 and a +5/−5 VAC Dual power supply 210, such as models 8994-KT and 8993-KT, respectively, manufactured by Marlin P. Jones & Associates. From dual power supply 208 an power output line 209 has a split line 211 passing to an optional remote power control circuit 600 shown and described in greater detail in reference to FIG. 6.

Figure 3:
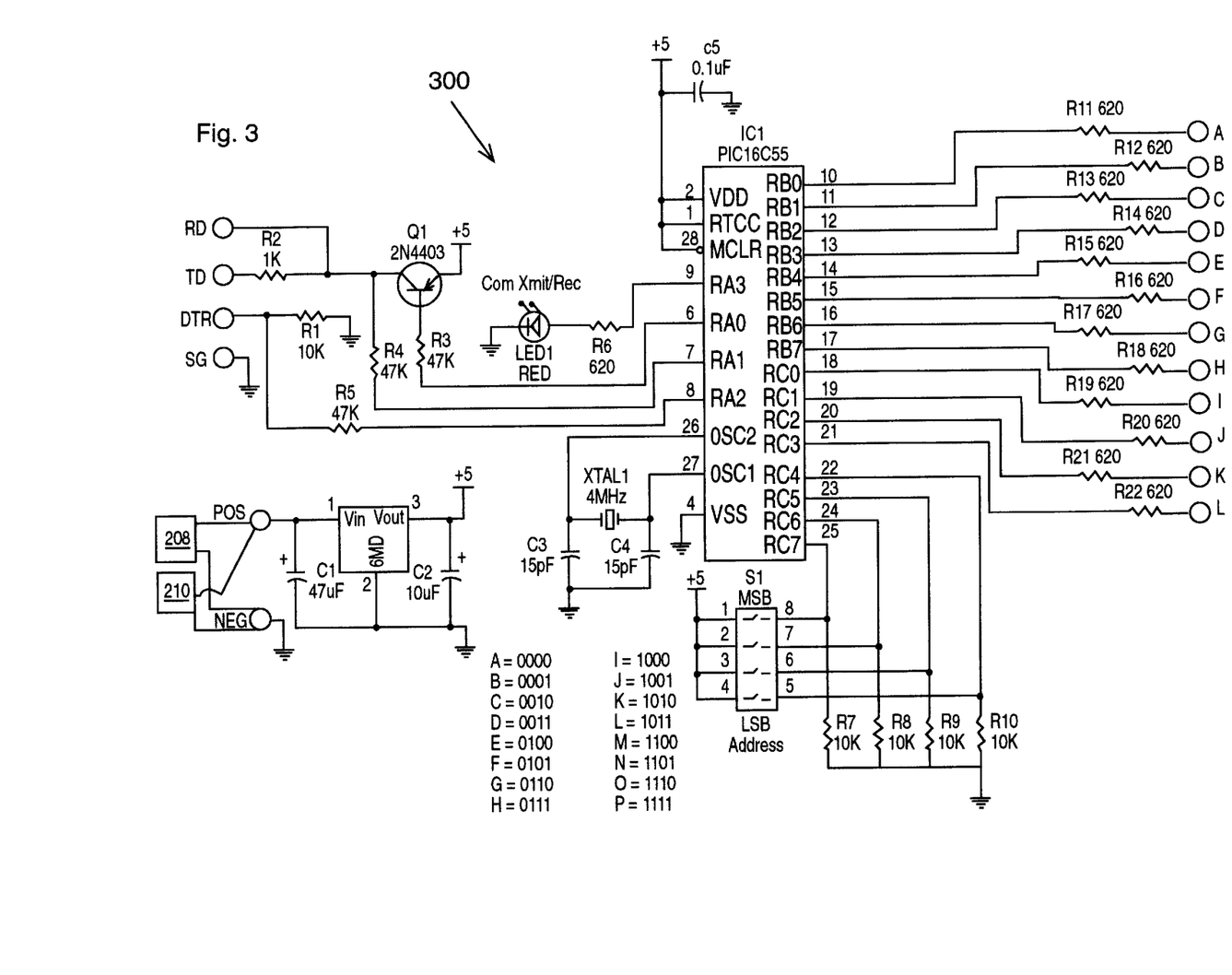
FIG. 3 is a schematic of the one of the x&y control digital input output cards used within the main control box in FIG. 2.

FIG. 3 is a schematic 300 of one of the x&y control digital input output cards 300X, 300Y used within the main control box 200 in FIG. 2. Referring to FIGS. 2 and 3, serial connection 201 splits into lines 231 and 233 to pass into one of the dual input/output(I/O) cards 300X, 300Y controlling the x-axis and y-axis of the laser scanner and pointer 700 shown and described in greater detail in reference to FIGS. 7A–7C. Referring to FIG. 3, each of the I/O cards 300X, 300Y can be an RS-232 Digital Input/Output Card 300 manufactured by Weeder Technologies of Batavia, Ohio, which is non essential subject matter incorporated by reference. Card 300 includes an IC1, part No. PIC16C55-XT/P, an EPROM-based 8-bit CMOS microcontroller manufactured by Microchip. This microcontroller has two 8-bit I/O ports, one 4-bit I/O port, and internal EPROM memory which holds the program used for encoding/decoding the data sent to and from computer 120, reading and writing to the I/O pins, and reading the DIP switch setting (S1) which sets the board address. A crystal, XTAL1, sets the clock frequency. The voltage levels used for serial communications on an RS-232 port are +3V to +25V for a logic 0, and −3V to −25V for logic 1. Most RS-232 devices use +12V and −12V respectively. Bit 0 of port-A is used to send data to the serial port. A logic 1 is generated by placing bit 0 at a high level which turns off Q1, thus allowing the −12V from the TD(Transmit Data) pin to be applied to the RD(Receive Data) pin thru R2. Bit 0 is sent low to produce a logic 0 which turns on Q1, pulling the RD pin to +5V. Because the TD pin of an RS-232 port is normally at a marking level(−12V), it is possible "steal" from it the negative voltage needed for communications at RS-232 levels and a separate supply is not required. Bit 2 of port-A is tied to the DTR(Data Terminal Ready) pin thru R5 and determines when the unit is plugged into an active RS-232 port. Bit 1 of port-A is tied to the RD pin thru R4 and is used to verify an idle RS-232 state prior to sending any serial data. Power is supplied by dual power supplies 208, 210 through a 78L05 voltage regulator which drops the input voltage to 5 volts which is required by the circuit 300. Capacitors C1 and C2 stabilize the operation of the regulator IC2 and provide filtering. A red LED 1 is used to indicate when communications with computer 120 is active. Current limiting resistors R11 thru R22 protect IC1s I/O pins from excessive current flow during accidental shorts to 5V or ground. The DIP switch(S1) together with the pull-down resistors R7 thru R10 are used to set the address of the RS-232 Digital I/O 300.

Figure 4:
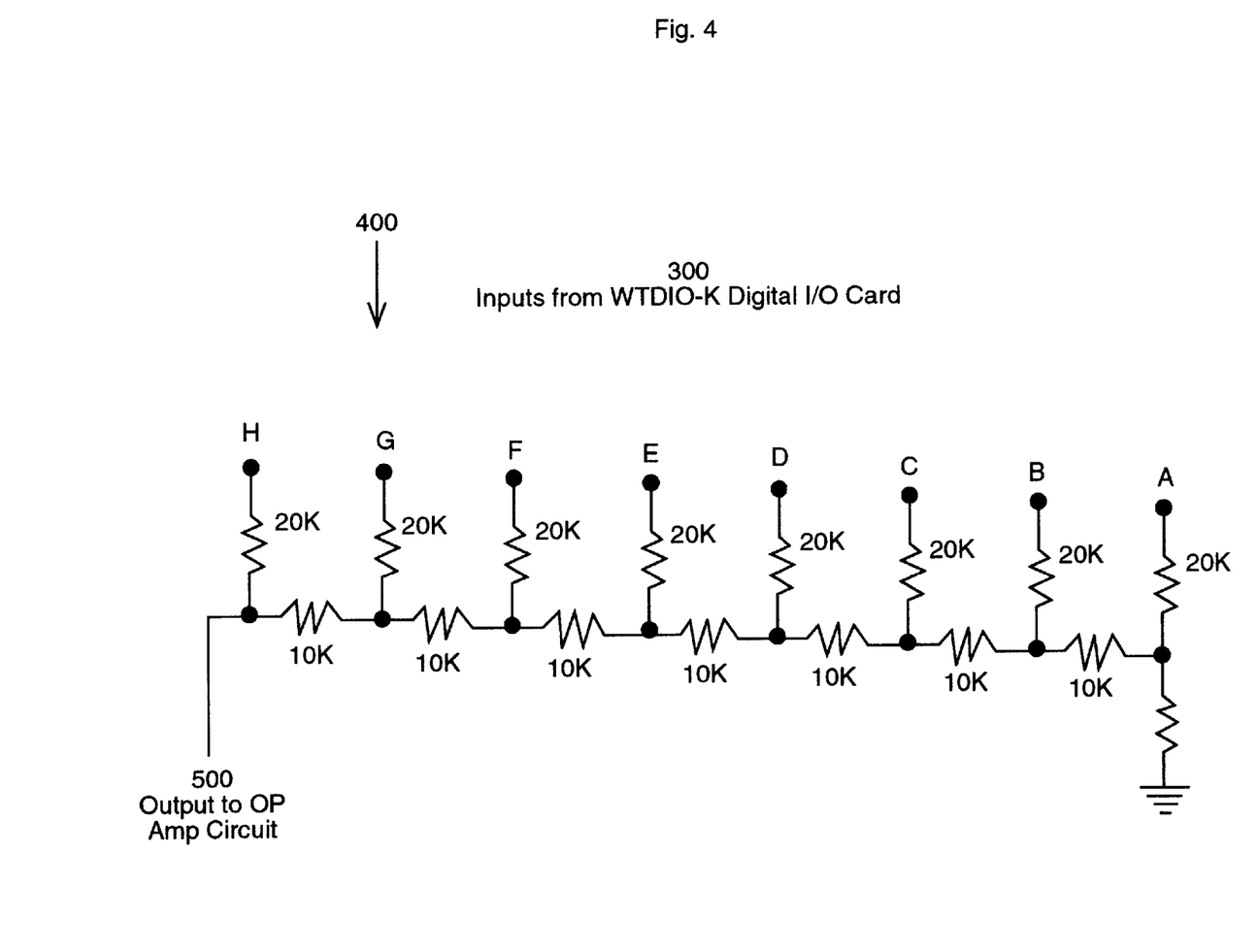
FIG. 4 is a schematic of one of the x&y digital to analog circuits used within the main control box of FIG. 2.

Each of the I/O cards 300X, 300Y, connect to Digital to Analog convertor circuits 400X, 400Y, of which one is shown and described in greater detail in reference to FIG. 4, where I/O pins A–H of the I/O card 300 connect to nodes A–H of D/A card 400 and through 10K and 20K ohm resistors to an output to OP amp circuit 500. The extra pins I–L in I/O card 300 can be held in reserve and used additional controlling of switching of the Remote camera 800 shown in FIG. 2.

Figure 5:
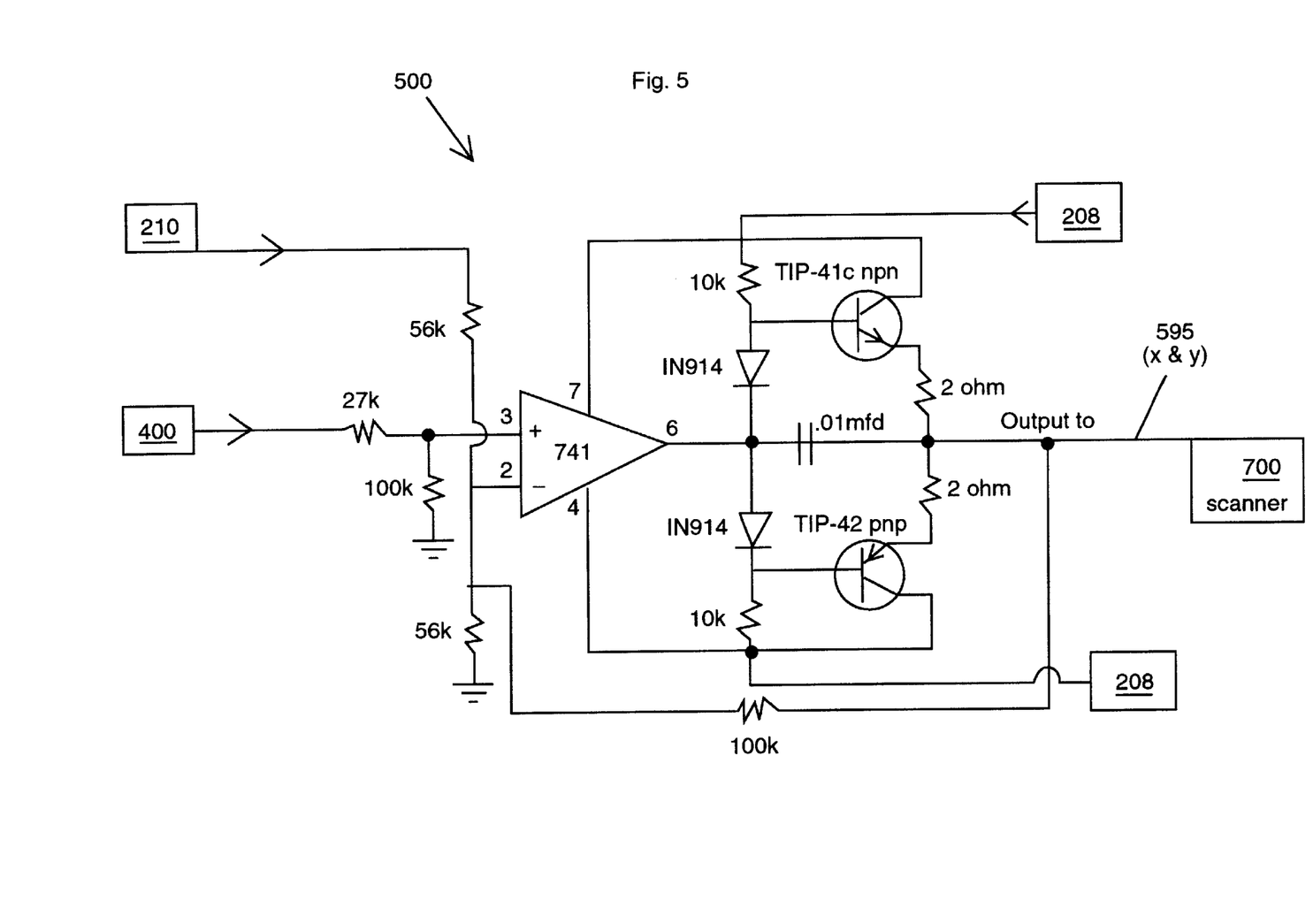
FIG. 5 is a schematic of one of the x&y Op amp circuits used within the main control box of FIG. 2.
Figure 7:
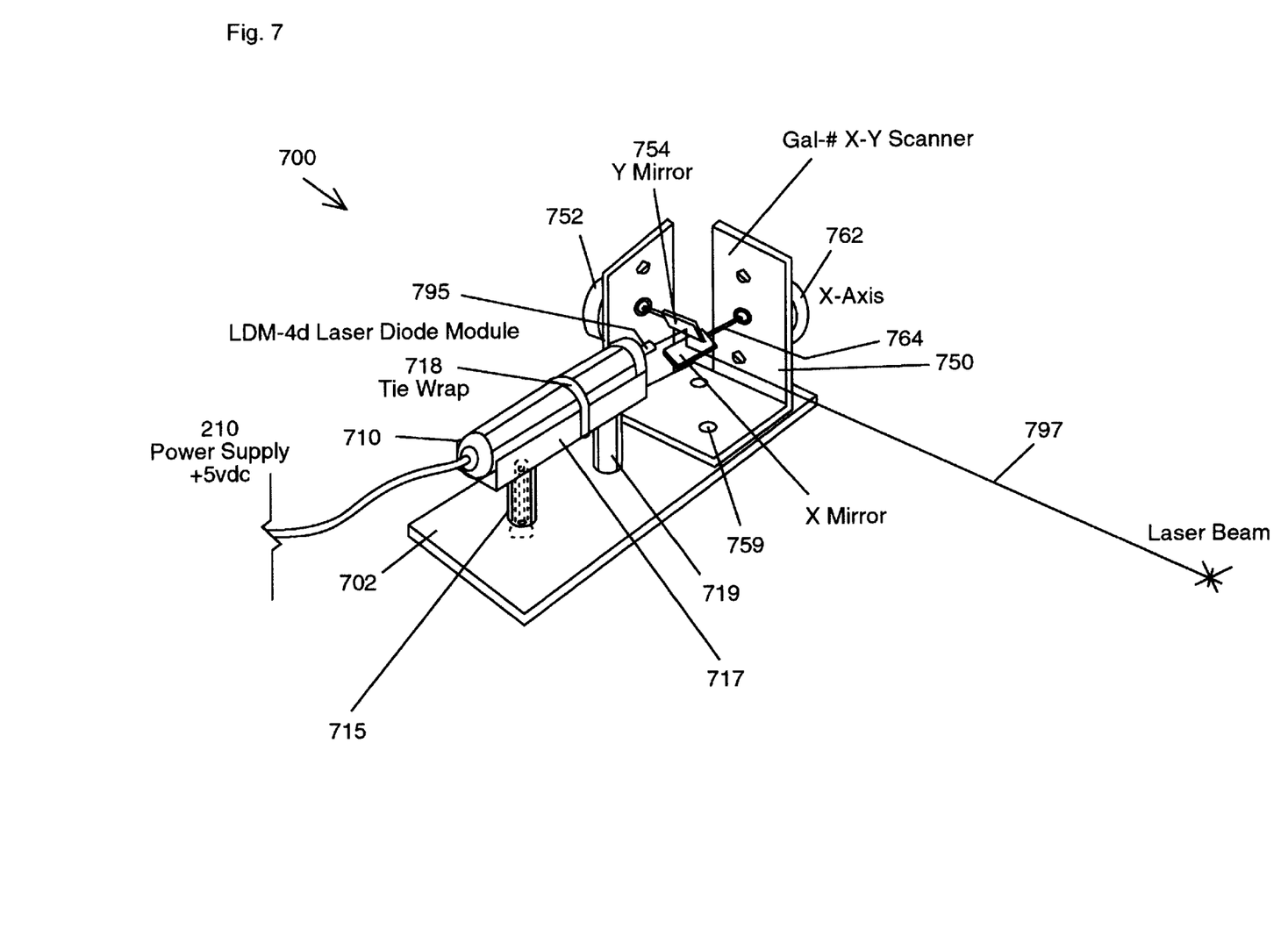
FIG. 7 is a preferred embodiment of the x and y axes adjustable laser scanner/pointer used with the remote laser pointer setup of FIG. 2.

FIG. 5 is a schematic 500 of one of the x&y Opamp circuits 500X, 500Y used within the main control box of FIG. 2. Power supplies 208 and 210 supply +5 and +15 volts respectively, to Opamp circuit 500, with an input coming in from D/A circuit 400. The purpose of the OP Amp circuit 500 is to create a "differential amplifier" which is used as a driver for the laser scanner 700(FIGS. 2, 7). The laser scanner 700 has two mirror servos 752, 762 which requires two separate and identical Op Amp circuits 500X and 500Y.

Referring to FIG. 5, VRef 1(reference voltage 1) is a voltage that is at the midpoint("zero") of the input signal or +5 volts from power supply 210. VRef 2(reference voltage 2) is a voltage that is the midpoint("zero") of the output voltage from the D/A circuit 400. As shown both reference voltages VRef 1 and VRef 2 are grounded and the input signal centers at 2.5 volts. The gain needed in circuit 500 is 9 divided by 2.5 which is 3.6. Resistors 100 k and 27 k are used on the input from the D/A 400. The midpoint of the two 56 k resistors has an effective resistance of 28 k and if one resistor is connected to ground and the other to +5 volts, the equivalent voltage is 2.5 volts. This particular part of circuit 500 takes care of the primary portion of the 741 Op Amp chip.

Since the actual scanner 700 FIGS. 5 and 7, requires 150 milli amp input current, a current booster is required in the Op Amp circuit 500 of FIG. 5. Top transistor T1P-41c is an NPN and lower transistor TIP-42 is a PNP. Power supply 208 supplies both the +15 volts needed and the −15 volts needed. The two voltages are needed for the higher current requirements of the scanner device 700. The 741 acts as a gate keeper for the transistors T1P-41c, T1P 41, which in this application are used similar as variable current controllers which outputs are channeled in to scanner devices 700. The diodes IN914 are used to control which portion of the current booster is to be used depending if a positive or a negative voltage is being used. The resistors 10 k and 2 ohms are used to set the current limits.

Figure 6:
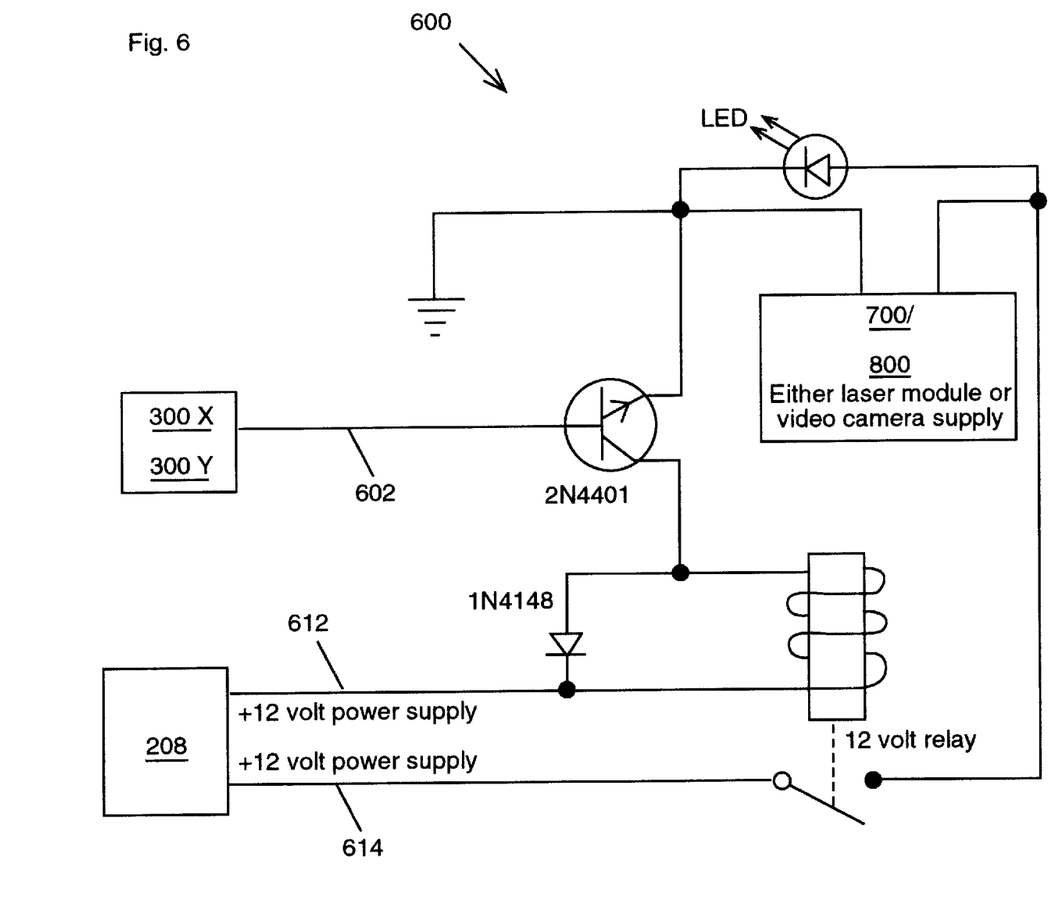
FIG. 6 is a schematic of an optional remote power control circuit used within the main control box of FIG. 2.

FIG. 6 is a schematic 600 of an optional remote power control circuit used within the main control box of FIG. 2. Having the ability to actually turn on and off a remotely located laser beam pointer by the operator is an essential feature of the subject invention since the operator is the individual who decides the need for showing the remote user the selected viewing point on the object being discussed using the laser beam. The operator can also decide when there are down times for using the laser pointer.

Referring to FIG. 6, schematic 600 is used to remotely be able to switch on and off the laser diode 700(FIGS. 2 and 7). Inputs 602 only needs to come off of one pin of either the 300X, 300Y, I/O cards (shown in FIGS. 2–3). For this example, we are using the 300X card and selecting the I pin and calling that pin address by our software. Again, any available pin on either card can be used as long as the software is set to call that particular pin address. When the address, I, pin is called by the software to activate, a constant +5 volt signal is inputed from the WTDIO-K to circuit 600. This signal voltage is applied to the 2N4401 transistor which is used in this circuit as a switch. The transistor allows the ground circuit of the relay source 208 and to close the relays contacts which allows current to flow from the power source 208 along lines 612, 614, to the laser diode 700 and the LED lamp which can light up to indicate that the laser diode 700 is active. The purpose of the 1N4148 diode is to cancel any back EMF signal. Circuit 600 can similarly be used to remotely power up and down the camera 800 of FIG. 2.

FIG. 7 is a preferred embodiment of the x and y axes adjustable laser scanner/pointer 700 used with the remote laser pointer setup of FIG. 2. Laser scanner/pointer 700 has line connections 595X and 595Y receive the control signals from the Op Amps 500X, 500Y. Laser scanner/pointer 700 includes a laser diode module 710 such as the LDM-4d Laser Diode manufactured by Meredith Instruments, and X-Y Axes Scanner 750 such as the Gal-3X-Y Scanner, also manufactured by Meredith Instruments. The diode module 710 mounts to an aluminum flat plate 702 screwed onto wrapped tubing supports 715, 719 which are attached to a U shaped channel 717 by a tie wrap 718. The scanner 750 is fastened to the plate 702 with screws 759. In operation a laser beam 795 is emitted from diode module 795, an electromagnet 752 for a y-axis controlled mirror 754 and an electromagnet 762 for a x-axis controlled mirror 764 adjust the beam to be directed toward selected areas on the object 1000 being pointed at as shown in FIG. 2. Referring back to FIG. 2, a video camera 800 such as an RCA high resolution color video camera CCD with an RCA output jack is takes in the field of view of the object 1000, and sends signals through line 802 to video capture card 128 of computer 120 that is transmitted to operator site 1 of FIG. 1. Camera 800 receives power from an optional remote control circuit for switching on Video camera 800.

Figure 8:
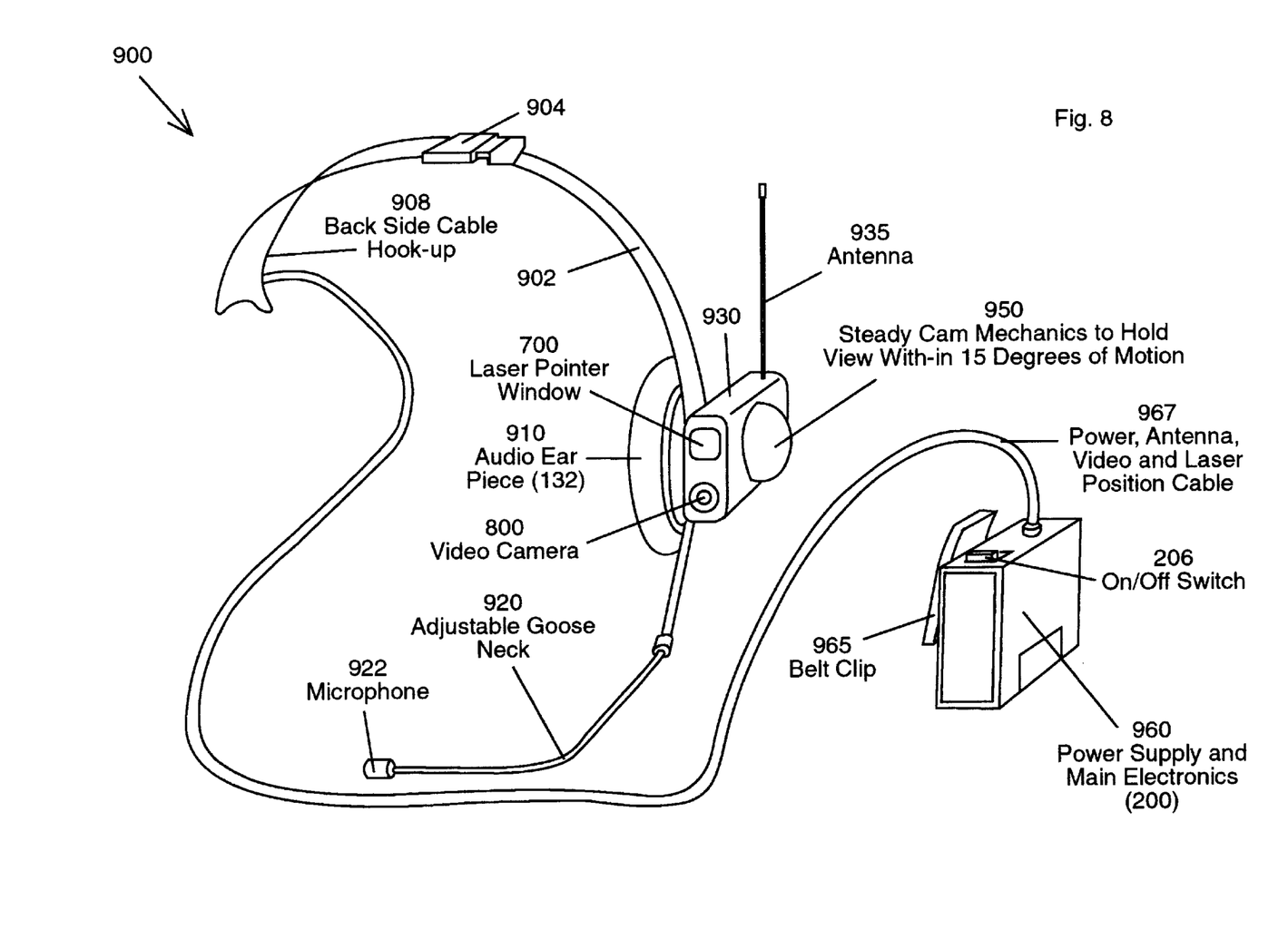
FIG. 8 is a perspective view of a headset that can be used with the remote pointer setup of FIG. 2.

FIG. 8 is a perspective view of a headset that can be used with the remote pointer setup of FIG. 2. The headset system 900 can be used in place of the speaker phone setup 130, the video camera 800 and the laser scanner/pointer 700 and main control box 200 of FIG. 2. The headset system can include a curved flexible plastic type headpiece 902 with adjustable top portion 904 for being used with technicians having different sized heads. A cushioned audio ear piece 910 having a built-in speaker (132 of FIG. 2) connects to one end of the headpiece and a headset attachment box 930 has a built-in laser scanner/pointer 700 and video camera 800, and an adjustable downwardly projecting goose neck 920 connects to a microphone 922. An antenna 935 on attachment box 930 allows for remote communications to the computer 120 shown in FIG. 2 which can have a matching antenna(not shown). Referring to FIG. 8, a backside cable hookup 908 connects the headset 902 a beltclip 965 worn main control box 960 which has the components shown and described in control box 200 of FIG. 2.

The operation of the novel invention will now be described. Referring to FIGS. 1–2, the laser scanner/pointer 700 would be mounted directly beside the camera 800 which would allow the camera's field of view to be viewed and scanned with the laser pointer 700 by the operator 5(FIG. 1). The operator 5 can respond to the remote located technician 105 if the latter has verbal questions directed into microphone 134 by the use of telephone modem connections 45, 46, 145, 146 and by physically pointing to an area of an object 1000 which may be under discussion.

Referring to FIGS. 1–2, once a communications link (handshaking by modems) 24, 124 has been established by the operator's system 1 and the remote system 100, information streaming can now be used between the two systems. A telephony communications software that uses video and audio such as NetMeeting by Microsoft, will allow video and audio streaming from the remote system 100 to the operators system 1, FIGS. 1–2. Video does not have to be actively supplied to the remote but however audio does need to be active. Now the operator 5 can see the environment 100 the remote technician 105 is in and communicate back and forth by audio to each other. Now the Visual Echo (remote pointer) software can be run by both the operator and the remote. The operator 5 has to set his software up as master while the remote 105 must set his as slave. This allows the operator to address the remotes hardware 200 to control the remote laser scanner/pointer 700. Once both parties are online and set up, the operator 5 will be able to click on the laser scanner/pointer 700 which will be seen in his/her video window 12. The operator 5 will be able to direct the laser beam 797 to point to anything in their video window 12 by simply moving the mouse 14 within a set area in the software, the same way as moving the pointer arrow in Windows.

By moving the mouse 14 within the set parameter in the Visual Echo software at the operator's system in computer 20, coordinates are being generated (the "x"0 and "y"0 value) and sent to the remote site's Visual Echo software in computer 120 along with I/O card address value for each "x"0 and "y", where in turn it directs it to the configured serial port on the remote's PC 120. Software can be written to communicate with the Weeder Technology's (WTDIO-K RS-232 I/O) I/O cards 300X, 300Y where a separate address for the "x"0 value and a separate address for the "y"0 value being transmitted by the operator will determine which card the information of a particular coordinate will go. There are two identical cards 300X, 300Y that handle this application. One card, which has it's own address, handles the "x"0 value and the other, which has it's own address, handles the "y"0 value. For this application, the I/O cards 300X, 300Y inputs hexidecimal information from the serial port and outputs 12 bit binary, but for this application we are only concerned with only eight of the 12 bit outputs from each of the cards. This gives the operator 5 a 256×256 resolution of control in the field of view from the video steam from the remote.

The following will be discussed as one, but actually will apply to both circuits for the "x"0 control and the "y"0 control circuits.

Referring to FIGS. 1–2, once the eight bit information is present at the card 300, each bit is either on of off, depending on what is being needed by the operator 5. Each single bit has a voltage value equal to +5 if on and 0 if off. This voltage output is feed into a simple binary ladder which is considered a digital to analog converter or D/A circuit 400. This D/A circuit 400X, 400Y are able to take the total sum of the applied voltages from the I/O cards 300X, 300Y and output a single output voltage, with a total of 256 points in between 0 to +5 volts. As the operator 5 moves the mouse 14, the invention, allows the voltage output o the D/A circuits 400X, 400Y to change. This output voltage is now feed into an operational amplifier circuit 500X, 500Y which converts this voltage to a greater amount of voltage and amperage which is needed by the scanner/pointer 700. The scanner/pointer 700 is described by Meredith as an X-Y Scanner. It has a square aluminum base which supports two electromagnet devises (one for X and one for Y)(752, 764 FIG. 7). Each electromagnet 752, 764 in FIG. 7 is housed in a round cylindrical compartment with a shaft extending from one side with mirrors 754, 764 attached to its ends. These shafts have a total rotation movement of 15 degrees. The input voltage rating on the scanner/pointer 700 is +12 to −12 bolts. Being 0 volts holds the mirror position at center, +12 volts pulls the mirror to 7.5 degrees up and −12 volts pulls the mirror to 7.5 degrees down. The operational amplifiers 500X, 500Y(FIG. 2) supply these needed voltages to the scanner/pointer 700. When the D/A circuits 400X, 400Y supplying the OP amps 500X, 500Y, 0 volts, the output of the OP amps will be −12 volts. When the D/A circuits 400X, 400Y is supplying +2.5 volts, the output of the OP amps 500X, 500Y will be 0 volts. When the D/A circuits 400X, 400Y are supplying +5 volts, the output of the OP amps 500X, 500Y will be +12 volts. As you can see, anything in between any of of the D/A's output voltage will cause the output of the OP amps 500X, 500Y to change as well, resulting in movement of the mirrors 754, 764 shown in FIG. 7. Both the X and Y mirror movements 754, 764 are aligned in such a way a laser beam 795, is emitted into one, it is reflected to the other then out away from the devise as controlled beam 797. This positioning of the mirrors 754, 764 allows the operator 5 to position the point of the laser beam 797 to anyplace within the field of view on the object 1000.

Figure 9:
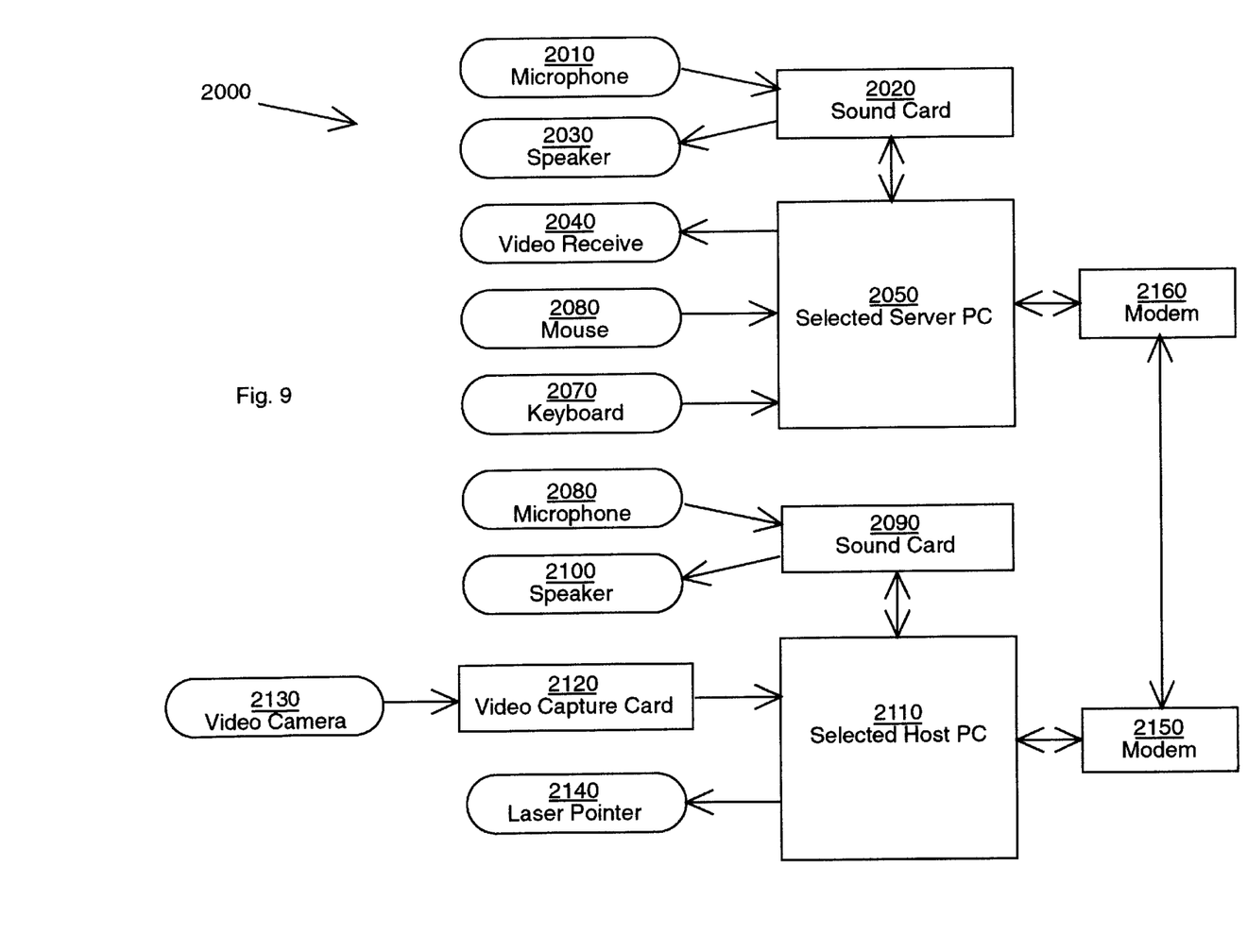
FIG. 9 is a flowchart of the communications between the remote system and the operator system shown in the preceding drawing figures.

FIG. 9 is a flowchart of the communications between the remote system and the operator system shown in the preceding drawing figures. Starting from the Remote PC(the bottom half of the figure), the Selected Host PC 2110 will contain a video capture card 2120, which is connected to a video camera 2130. The video camera 2130 is the "eye" of the remote area. Some newer cameras are set up to where a capture card is not needed and connect directly to the PC's communications port. The laser pointer 2140 connects to one of the PC 2110 communications port. The laser pointer 2140 can be controlled by the Operator from the Selected Servor PC 2050. A microphone 2080 and a speaker 2100 are connected to a sound card 2090 which is connected to the Selected Host PC 2110. These components allow audio communication from the remote location to the operator's site location.

Referring to FIG. 9, the operator's PC(shown in the top half of FIG. 9) 2050 can have a sound card 2020 with a microphone 2000 and speaker 2030 that allows audio communication to the remote site. The monitor/video receiver 2040 can be used to view the remotes location. The mouse 2060 of the PC 2050 will be used to position the laser beam in the remote's location. The keyboard 2070 can be used as an input device to the PC 2050. The modem 2160 can be used to link the operators data information to conventional phone lines for transferring of audio and data to the remote's site.

Although the preferred invention describes an internet type of communication system between the operator and the remote site, other types of communications can be used such as but not limited to satellite communications, and the like.

Although the preferred embodiment describes the operator controlling the laser pointer at one remote location, the operator can have either a split screen, or plural screens to control and direct laser pointers at plural remote sites.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A remotely operable laser pointer instruction system comprising in combination:
   a laser pointer with an adjustable pointing beam located at a first location;
   a worker adjacent to the laser pointer at the first location;
   a target at the first location, the pointing beam being adjustable directed to selected portions of the target at the first location, the target being adjacent to the worker; and
   a control means for operating the laser pointer, the control means located at a second location remote from the first location, an operator-instructor at the second location for physically controlling the control means, the target being not adjacent to the operator-instructor, wherein the operator-instructor at the second location controls and adjusts the pointing beam being directed at the target at the first location with a computer.

2. The remotely operable laser pointer instruction system of claim 1, wherein the laser pointer includes:
   means for automatically adjusting an x-axis and a y-axis.

3. The remotely operable laser pointer instruction system of claim 1, wherein the control means includes:
   a second computer at the second location having a movable mouse where the operator-instructor at the second location viewing a screen of the laser pointer at the first location controls and adjusts the pointing beam with the moveable mouse.

4. The remotely operable laser pointer instruction system of claim 1, further comprising:
   a first microphone and a first speaker at the first location; and
   a second microphone and a second speaker at the second location, wherein the operator-instructor at the second location can verbally communicate with the worker at the first location.

5. The remotely operable laser pointer instruction system of claim 1, further comprising:
   a headset to be worn by the worker at the first location, the headset having the control means and the laser pointer both directly attached thereto.

6. The remotely operable laser pointer instruction system of claim 1, further comprising:
   means for allowing the operator-instructor to selectively turn the laser pointer on and off.

7. The remotely operable laser pointer instruction system of claim 6, wherein the selective turning means includes:
   a light indicator that visibly indicates whether the laser pointer is on and off.

8. The remotely operable laser pointer instruction system of claim 1, further comprising:
   a camera at the first location being aimed at the target for allowing the operator-instructor to visually select the selected portions of the target with the laser pointer as an instruction aid to the worker at the first location.

9. The remotely operable laser pointer instruction system of claim 1, further comprising:
   means for allowing the operator-instructor to adjust x and y axes coordinates of the laser pointer; and
   a camera at the first location being aimed at the target for allowing the operator-instructor to visually select the selected portions of the target with the laser pointer as an instruction aid to the worker at the first location.

10. A remotely operable laser pointer instruction system comprising in combination:
    a laser pointer with an adjustable pointing beam located at a first location;
    a worker adjacent to the laser pointer at the first location;
    a target at the first location, the pointing beam being adjustably directed to selected portions of the target at the first location, the target being adjacent to the worker;
    a control means for operating the laser pointer, the control means located at a second location remote from the first location, an operator-instructor at the second location for physically controlling the control means, the target being not adjacent to the operator-instructor, wherein the operator-instructor at the second location controls and adjusts the pointing beam being directed at the target at the first location with a first computer;
    a second computer at the second location having a moveable mouse so that the operator-instructor at the second location viewing a screen of the laser pointer at the first location controls and adjusts the pointing beam with the moveable mouse;

means for allowing the operator-instructor to adjust x and y axes coordinates of the laser pointer; and a camera at the first location being aimed at the target for allowing the operator-instructor to visually identify the selected portions of the target with the laser pointer as an instruction aid to the worker at the first location.

11. The remotely operable laser pointer instruction system of claim 10, further comprising:

a first microphone and a first speaker at the first location; and a second microphone and a second speaker at the second location, wherein the operator-instructor at the second location can verbally communicate with the worker at the first location.

12. The remotely operable laser pointer instruction system of claim 10, further comprising:

a headset to be worn by the worker at the first location, the headset having the control means and the laser pointer both directly attached thereto.

13. The remotely operable laser pointer instruction system of claim 10, further comprising:

means for allowing the operator-instructor to selectively turn the laser pointer on and off.

14. The remotely operable laser pointer instruction system of claim 13, wherein the selective turning means includes:

a light indicator that visibly indicates whether the laser pointer is on and off.

15. The remotely operable laser pointer instruction system of claim 1, further comprising:

a telephone-line modem communication link between the control means and the laser pointer.

16. The remotely operable laser pointer instruction system of claim 1, further comprising:

an Internet communication link between the control means and the laser pointer.

17. The remotely operable laser pointer instruction system of claim 1, further comprising:

a satellite communication link between the control means and the laser pointer.

18. The remotely operable laser pointer instruction system of claim 10, further comprising:

a telephone-line modem communication link between the control means and the laser pointer.

19. The remotely operable laser pointer instruction system of claim 10, further comprising:

an Internet communication link between the control means and the laser pointer.

20. The remotely operable laser pointer instruction system of claim 1, further comprising:

a satellite communication link between the control means and the laser pointer.

* * * * *